(12) United States Patent
Pine

(10) Patent No.: US 7,942,329 B2
(45) Date of Patent: May 17, 2011

(54) METHOD FOR PROVIDING USER FEEDBACK IN AN AUTOIDENTIFICATION SYSTEM

(75) Inventor: Jeffrey A. Pine, Auburn, NY (US)

(73) Assignee: Jadak, LLC, North Syracuse, NY (US)

( * ) Notice: Subject to any disclaimer, the term of this patent is extended or adjusted under 35 U.S.C. 154(b) by 0 days.

(21) Appl. No.: 11/838,289

(22) Filed: Aug. 14, 2007

(65) Prior Publication Data
US 2009/0045261 A1 Feb. 19, 2009

(51) Int. Cl.
| G06K 7/10 | (2006.01) |
| G06K 7/14 | (2006.01) |
| G06K 7/00 | (2006.01) |
| G06K 19/00 | (2006.01) |
| G06K 9/24 | (2006.01) |
| G08B 13/14 | (2006.01) |
| H04Q 5/22 | (2006.01) |

(52) U.S. Cl. ............. 235/462.01; 235/435; 235/454; 235/487; 235/462.2; 235/462.21; 340/572.1; 340/10.1; 340/10.3

(58) Field of Classification Search .......... 235/435, 235/454, 487, 492, 493, 472.01, 462.2, 462.21; 340/572.1, 10.1, 10.3
See application file for complete search history.

(56) References Cited

U.S. PATENT DOCUMENTS

| 4,902,883 A * | 2/1990 | Poland ................. 235/462.15 |
| 5,004,916 A * | 4/1991 | Collins, Jr. .............. 250/235 |
| 5,140,141 A * | 8/1992 | Inagaki et al. .......... 235/462.43 |
| 5,200,597 A * | 4/1993 | Eastman et al. ............ 235/455 |
| 5,750,976 A * | 5/1998 | Eastman et al. ......... 235/462.36 |
| 6,286,763 B1 * | 9/2001 | Reynolds et al. ........ 235/472.01 |
| 6,832,725 B2 * | 12/2004 | Gardiner et al. ........ 235/462.21 |
| 7,021,546 B2 * | 4/2006 | Watanabe et al. ....... 235/462.25 |
| 7,090,137 B1 * | 8/2006 | Bennett .................. 235/472.01 |
| 7,199,719 B2 * | 4/2007 | Steinberg .................. 340/572.8 |
| 7,207,486 B1 * | 4/2007 | Bennett ..................... 235/385 |
| 7,262,420 B1 * | 8/2007 | MacLeod et al. ......... 250/458.1 |
| 7,270,274 B2 * | 9/2007 | Hennick et al. ......... 235/462.43 |
| 7,331,524 B2 * | 2/2008 | Vinogradov et al. .... 235/462.25 |
| 7,475,823 B2 * | 1/2009 | Brock et al. ............ 235/462.25 |
| 7,513,431 B2 * | 4/2009 | Chiu ...................... 235/472.02 |
| 7,614,554 B2 * | 11/2009 | Mott et al. .................... 235/440 |
| 7,631,809 B2 * | 12/2009 | Mott ............................ 235/440 |
| 7,743,975 B2 * | 6/2010 | Miller ......................... 235/375 |
| 7,764,163 B2 * | 7/2010 | Miller ........................ 340/10.1 |
| 7,766,235 B2 * | 8/2010 | Miller ......................... 235/440 |
| 2001/0003041 A1 * | 6/2001 | Redford et al. ........... 434/307 R |
| 2001/0042786 A1 * | 11/2001 | Reynolds et al. ............ 235/385 |
| 2001/0045460 A1 * | 11/2001 | Reynolds et al. ............ 235/385 |

(Continued)

Primary Examiner — Daniel Walsh
(74) Attorney, Agent, or Firm — David L. Nocilly; Bond Schoeneck & King, PLLC

(57) ABSTRACT

An optical barcode and/or RFID reader having at least two sets of illuminating LEDs that are directed toward a target object to reflect whether the barcode and/or RFID reading was successful or unsuccessful. The reader is provided with a set of red LEDs and a set of green LEDs for illuminating targets, such as barcodes or RFID tags. In addition to using these LEDs to illuminate the target, the reader will illuminate the target with a particular color of light to signify a successful read, such green light, or an unsuccessful read, such as red light. A third color may be provided to indicate a successful RFID interrogation, such as blue light. The reader thus uses the built-in illumination LEDs to cast differently colored light on the target, rather than having to provide additional LEDs in a user interface positioned on the housing of the reader.

12 Claims, 3 Drawing Sheets

U.S. PATENT DOCUMENTS

| | | |
|---|---|---|
| 2002/0008140 A1* | 1/2002 | Reynolds et al. ............. 235/385 |
| 2002/0020742 A1* | 2/2002 | Streicher et al. ............. 235/381 |
| 2002/0185542 A1* | 12/2002 | Wilz et al. ................ 235/462.46 |
| 2003/0001018 A1* | 1/2003 | Hussey et al. ............. 235/472.01 |
| 2003/0019934 A1* | 1/2003 | Hunter et al. ............. 235/462.2 |
| 2003/0029917 A1* | 2/2003 | Hennick et al. .............. 235/454 |
| 2003/0034394 A1* | 2/2003 | Gannon et al. ................ 235/454 |
| 2003/0062413 A1* | 4/2003 | Gardiner et al. .............. 235/454 |
| 2003/0089776 A1* | 5/2003 | Hennick et al. .............. 235/454 |
| 2004/0164162 A1* | 8/2004 | Watanabe et al. ........ 235/462.25 |
| 2004/0201455 A1* | 10/2004 | Hulvey ........................ 340/10.2 |
| 2005/0187819 A1* | 8/2005 | Johnson .................... 705/14 |
| 2005/0212676 A1* | 9/2005 | Steinberg .................. 340/572.8 |
| 2005/0258252 A1* | 11/2005 | Winter et al. ............. 235/472.02 |
| 2005/0284942 A1* | 12/2005 | Gurevich et al. ........ 235/462.21 |
| 2006/0138232 A1* | 6/2006 | Hammerslag et al. ........ 235/440 |
| 2006/0244592 A1* | 11/2006 | Kansala et al. ............... 340/571 |
| 2006/0266840 A1* | 11/2006 | Vinogradov et al. .... 235/462.45 |
| 2006/0267730 A1* | 11/2006 | Steinke et al. ............. 340/10.1 |
| 2007/0040034 A1* | 2/2007 | Hennick et al. ......... 235/462.41 |
| 2007/0069024 A1* | 3/2007 | Barkan et al. ................ 235/454 |
| 2007/0108284 A1* | 5/2007 | Pankow et al. ................ 235/454 |
| 2007/0108392 A1* | 5/2007 | Ross .......................... 250/458.1 |
| 2007/0143162 A1* | 6/2007 | Keever et al. ..................... 705/7 |
| 2007/0145293 A1* | 6/2007 | Roth .......................... 250/458.1 |
| 2007/0187266 A1* | 8/2007 | Porter et al. ................... 206/232 |
| 2007/0205377 A1* | 9/2007 | MacLeod et al. .......... 250/458.1 |
| 2007/0210157 A1* | 9/2007 | Miller .......................... 235/435 |
| 2007/0210158 A1* | 9/2007 | Miller .......................... 235/435 |
| 2007/0210159 A1* | 9/2007 | Mott et al. ..................... 235/435 |
| 2007/0267581 A1* | 11/2007 | Roth .......................... 250/458.1 |
| 2007/0272756 A1* | 11/2007 | Brock et al. ............. 235/462.25 |
| 2008/0106387 A1* | 5/2008 | Miller .......................... 340/10.5 |
| 2008/0136647 A1* | 6/2008 | Brown ...................... 340/572.8 |
| 2008/0180215 A1* | 7/2008 | Mott ............................ 340/10.1 |
| 2008/0217411 A1* | 9/2008 | Ledwith et al. .......... 235/472.02 |
| 2008/0230607 A1* | 9/2008 | Etten ........................... 235/435 |
| 2009/0045261 A1* | 2/2009 | Pine ......................... 235/462.42 |
| 2009/0173791 A1* | 7/2009 | Pine et al. ..................... 235/454 |
| 2009/0212114 A1* | 8/2009 | Vollmer .................... 235/462.41 |
| 2011/0017828 A1* | 1/2011 | Pine ......................... 235/472.01 |

* cited by examiner

METHOD FOR PROVIDING USER FEEDBACK IN AN AUTOIDENTIFICATION SYSTEM

BACKGROUND OF THE INVENTION

1. Field of the Invention

The present invention relates to autoidentification systems and, more particularly, to a system and method for providing user feedback using target illumination sources.

2. Description of the Related Art

Autoidentification systems, such as optical imagers and radiofrequency identification (RFID) readers are being used with increasing frequency for a variety of applications, including obtaining medical information or medical data from patients and medication contains, verifying the contents of patient medical samples, or extracting information from labeled products, such as shipping containers or retail items that contain barcodes or RFID tags.

Barcodes are essentially graphic representation of data (alpha, numeric, or both) that is machine-readable. Barcodes encode numbers and letters into different types of symbologies, such as linear codes, two-dimensional codes, and composite codes (a combination of linear and two-dimensional codes). In more recent applications, referred to as digital or optical image capture, an optical device snaps a digital picture of the barcode and software in the imager orients the picture and decodes the barcode(s) contained in the picture.

Radiofrequency identification (RFID) is a wireless communication technology that utilizes radiowaves for automatic identification and data capture of information for the purpose of identifying and tracking objects or people. Signals in the radio frequency (RF) range of the electromagnetic spectrum are used to communicate data between a two transceiver devices. An RFID system typically consists of the three main components: a tag, a reader, and the software/firmware for controlling the system. Tags are placed on objects or people and directly or indirectly contain information about the object or person. The reader uses RF energy to interrogate the tag and read the information it contains, or even write data to the tag.

Technologies such as barcode imaging and RFID can play an important role in various fields by automating processes and improving safety and security. For example, the ability to more accurately track objects and instantly provide data about the object is becoming a particularly important tool in the medical field, where automated systems can help improve safety procedures and limit human errors. In one such system, medical samples and prescription medication may often be provided with a barcode to assist with tracking the formulation and delivery of the medication or samples, and proper identification of the patient to whom the medication or samples belong. RFID technology may be used for tracking medical devices to ensure that the right device is available to the correct patient at the correct time, or to track the location of high-risk devices like implants that may relocate within a patient.

Although conventional barcode readers may include on-board illumination sources, such as light-emitting diodes (LEDs) for enhancing the visibility of the target, barcode readers and RFID systems rely on other LEDs to indicate the status of autoidentification processes. For example, the housing for the barcode or RFID reader may include LEDs aligned to indicate to the user a successful barcode interpretation or RFID interrogation. In addition to increasing the cost and complexity of such systems, the use of status LEDs is cumbersome as the user must try to perceive the target barcode or RFID tag and consider the special LEDs at the same, which may not be easily viewed or even in the proximity of the user.

BRIEF SUMMARY OF THE INVENTION

It is therefore a principal object and advantage of the present invention to provide a system and method for providing feedback to a user that is cost effective.

It is an additional object and advantage of the present invention to provide a system and method for providing feedback to a user that is more easily perceived.

It is a further object and advantage of the present invention to provide a system and method for providing feedback to a user that is simple to implement.

In accordance with the foregoing objects and advantages, the present invention provides the use of the existing illumination system of a handheld or stand-mounted optical imager, or a combined optical imager and radiofrequency identification (RFID) reader, to reflect the status of operations to the user, i.e., whether the barcode and/or RFID reading was successful or unsuccessful. A barcode or RFID device is provided with at least two sets of illuminating LEDs that are directed toward a target object. Preferably, red LEDs are used for illuminating barcodes and a second set of LEDs, such as green, may also be provided for enhanced illumination. In addition to using these LEDs to illuminate the target, the present invention illuminates the target with a particular color of light to signify a successful read, such as green light, or an unsuccessful read, such as red light. A third color may be provided to indicate a successful RFID interrogation, such as blue light. The present invention thus uses the built-in illumination LEDs to cast differently colored light on the target, rather than having to provide additional LEDs in a user interface positioned on the housing of the reader.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
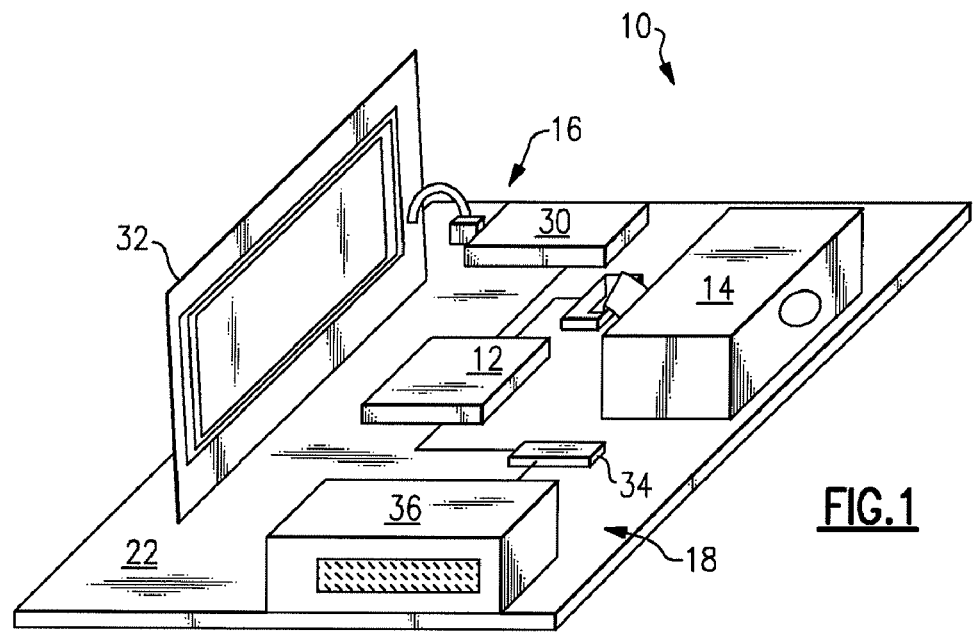
FIG. 1 is a perspective view of an optical imaging and RFID reader having multicolored illumination sources according to the present invention

Referring now to the drawings, wherein like reference numerals refer to like parts throughout, there is seen in FIG. 1 a optical imaging and RFID interrogation reader 10. It should be recognized by those of skill in the art that the present invention may be used in combination with either a barcode reader or an RFID reader, or both and unit 10 is described as having both readers for illustrative purposes only.

Reader 10 generally comprises a microcontroller 12 that interconnects a first optical imager 14 and/or an RFID unit 16 to a host interface 18. Alternatively, reader 10 is capable of interconnecting any variety of data capturing devices as sub-modules and providing host controllability, including optical imagers, RFID transceivers, lasers, scales, thermometers or temperature probes, etc., in any variety of combinations. Reader 10 may be arranged on a single printed circuit board 22 and encased as a single unit or housing. Integration of imager 14 and RFID unit 16 through interface 18 allows for combining control of operation of both submodules, such as RFID reading and barcode, through reader 10, as will be explained in detail hereinafter.

Figure 2:
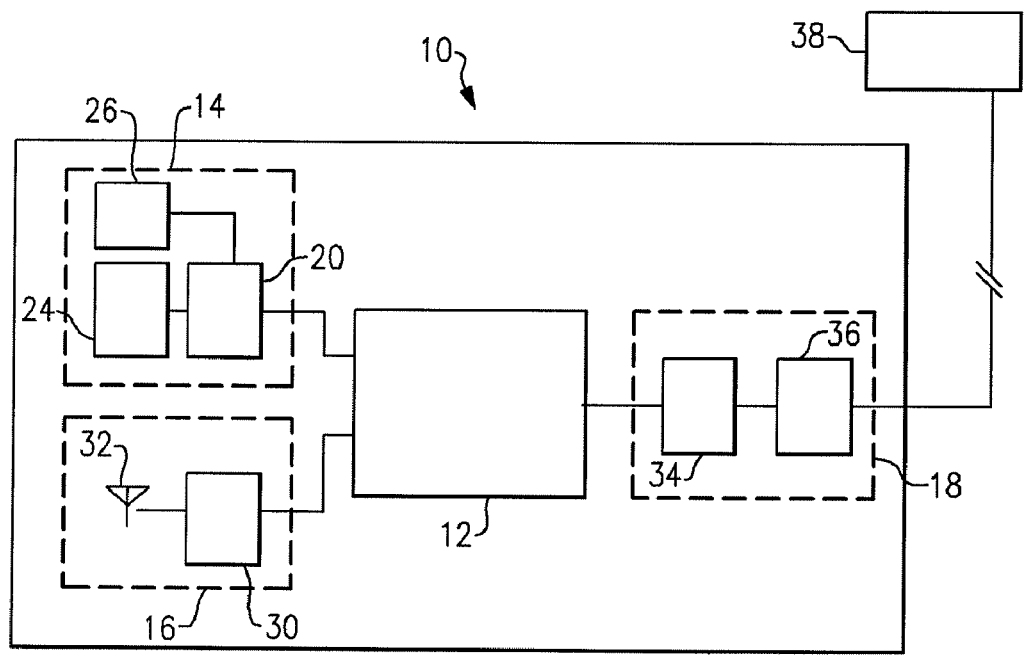
FIG. 2 is a schematic of the electronics in an optical imaging and RFID reader having multicolored illumination sources according to the present invention.

Referring to FIG. 2, optical imager 14 comprises an image engine 20 having image processing circuitry interconnected to microcontroller 12 for omni-directional optical scanning. Image engine 20 controls an image sensor 24, such as a complementary metal oxide semiconductor (CMOS) image sensor, and is capable of capturing two-dimensional images of 1D linear barcodes, 2D stacked/matrix barcodes, standard optical character recognition (OCR) fonts, Reduced Space Symbology (RSS) barcodes, and postal barcodes, as well as providing image captured images for use in a wide range of applications, such as image and shape recognition, signature capture, image capture, and non-standard optical character recognition.

Imager 14 may comprise, but is not limited to, an IT4X10/80 SR/SF or IT5X10/80 series imager available from Hand Held Products, Inc. of Skaneateles Falls, N.Y. that is capable of scanning and decoding most standard barcodes including linear, stacked linear, matrix, OCR, and postal codes. Specifically, the IT5X10/80 series imager is a CMOS-based decoded output engines that can read 2D codes, and has image capture capabilities sufficient for use with module 10. Imager 14 obtains an optical image of the field of view and, using pre-programmed algorithms in image engine 20, deciphers the context of the image to determine the presence of any decodable barcodes, linear codes, matrix codes, and the like. Image engine 20 may be programmed to perform other image processing algorithms on the image captured by imager 14, such as shape recognition, match filtering, and other high-level processing techniques. Alternatively, a captured image may be processed by microprocessor 12, albeit with a decreased level of performance due to the additional communication time needed to transfer images from image engine 20 to microprocessor 12.

Reader 10 may comprise RFID unit 16 including an RFID transceiver 30 and associated RFID antenna 32 supporting standard RFID protocols, such as the TI Tag-it transponder protocol or ISO 15693. For these protocols, transceiver 30 operates at 13.56 MHz, and may comprise a S6700 Multi-Protocol Transceiver IC available from Texas Instruments of Dallas, Tex. Depending on the application, other frequency transceivers may be more appropriate based on target range, power availability, cost, etc. RFID unit 16 may further include a speaker or LED (not shown) for audibly indicating a successful interrogation of an RFID tag.

Antenna 32 is preferably a loop antenna of various sizes and turns implemented on a printed circuit board and connected to module 10, or a wire loop installed antenna installed directly onto module 10. Antenna 32 may be positioned remotely, thereby reducing the footprint of module 10 using an external connector, such as a MMCX coaxial connector. RFID transceiver 30 may be programmed to interrogate passive or active tags, process signals received from such tags (e.g., analog to digital conversion), and provide the information from the tags to microcontroller 12 for further processing or transmittal to a host computer via interface 18.

Host interface 18 comprises a host transceiver 34 and a host connector 36 for interconnection to a host device 38. Interface 18 may comprise a conventional RS232 transceiver and associated 12 pin RJ style jack. For example, an ADM202EARN available from Analog Devices, Inc. of Norwood, Mass. is a suitable RS-232/V.28 interface device having compliant levels of electromagnetic emissions and immunity. Alternatively, interface 18 may comprise other conventional buses, such as USB, IEEE 1394, I2C, SPI, or PCMCIA, or other connector styles, such as an FFC style to an embedded host or another module 10. Interface 18 may also comprise a wireless transceiver in lieu of connector 36 for wireless communication to a host computer. A Stewart Connector Systems Inc. SS-641010S-A-NF may serve as connector 36 for mating with a Stewart Connector 937-SP-361010-031 matching connector of a host device. Host interface 18 may also comprise a Molex MX52588 connector. Regardless of the type of connector 36 used, host transceiver 34 is programmed with the applicable protocols for interfacing with a host computer, such as USB, Bluetooth(r), and IrDA protocols. Transceiver 34 may also be programmed to support both non-inverted signal sense and inverted signal sense.

Microcontroller 12 comprises a conventional programmable microprocessor having on-chip peripherals, such as central processing unit, Flash EEPROM, RAM, asynchronous serial communications interface modules, serial peripheral interfaces, Inter-IC Buses, timer modules, pulse modulators with fault protection modules, pulse width modulators, analog-to-digital converters, and digital-to-analog converters. Additionally, the inclusion of a PLL circuit allows power consumption and performance to be adjusted to suit operational requirements. In addition to the I/O ports dedicated I/O port bits may be provided. Microcontroller 12 may further include an on-chip bandgap based voltage regulator that generates an internal digital supply voltage from an external supply range. Microcontroller 12 preferably comprises a Motorola MC9S12E128.

The functional integration of imager 14 and RFID unit 16 to interface 18 is accomplished by microcontroller 12, which receives and interprets host commands, and then executes the appropriate functions by driving imager 14 and/or RFID unit 16 accordingly. For example, the operation of imager 14 and RFID unit 16 may be triggered by serial commands sent to module 10 from a host device 38, or by a hardware button communicating directly with connector 36 or through host device 38. Microcontroller 12 may further be programmed to execute the functions otherwise performed by one or more of image engine 20, RFID transceiver 30, and host transceiver 34, thereby reducing the amount of circuitry and hardware required by reader 10.

Figure 3:
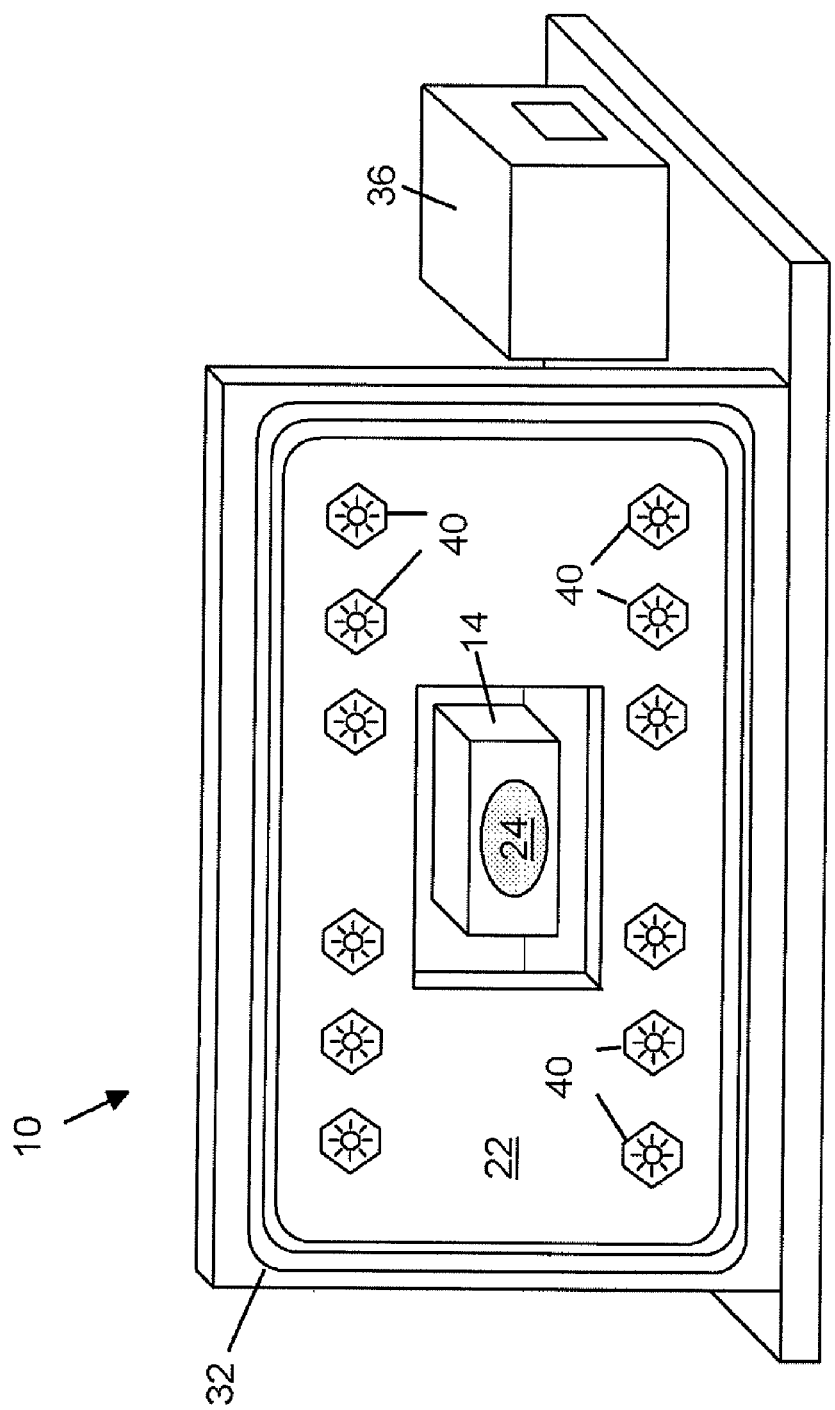
FIG. 3 is a schematic of an alternative embodiment of a separate illumination source according to the present invention.

As seen in FIGS. 2 and 3, reader 10 further includes an illumination source 26, such as one or more light-emitting diodes (LEDs) 40 of various wavelengths, i.e., colors. For example, as seen in FIG. 2, illumination source 26 may be provided as part of imager 14. In another embodiment of the present invention, illumination source 26 may be external to imager 14, such as on a separate circuit board as seen in FIG. 3. It should be recognized by those of skill in the art that illumination source 26 may internal to imager 14, external to imager 14 or reader 10, or provided as part of another component, such as RFID antenna circuit board 22 as seen in FIG. 3, or any combination thereof. In any case, illumination source 26 should include at least two different color LEDs 40, such as green and red. In another embodiment of the invention, illumination source 26 may include LEDs 40 of additional colors, such as blue. Illumination source 26 is preferably positioned to bathe a target, such as a barcode or RFID tag, with light to allow a user to more accurately direct reader 10 onto the target or properly illuminate the target for subsequent image capturing operations. As will be described hereinafter, illumination source 26 additionally provides feedback to the user on the status of the reading or interrogation operation.

Figure 4:
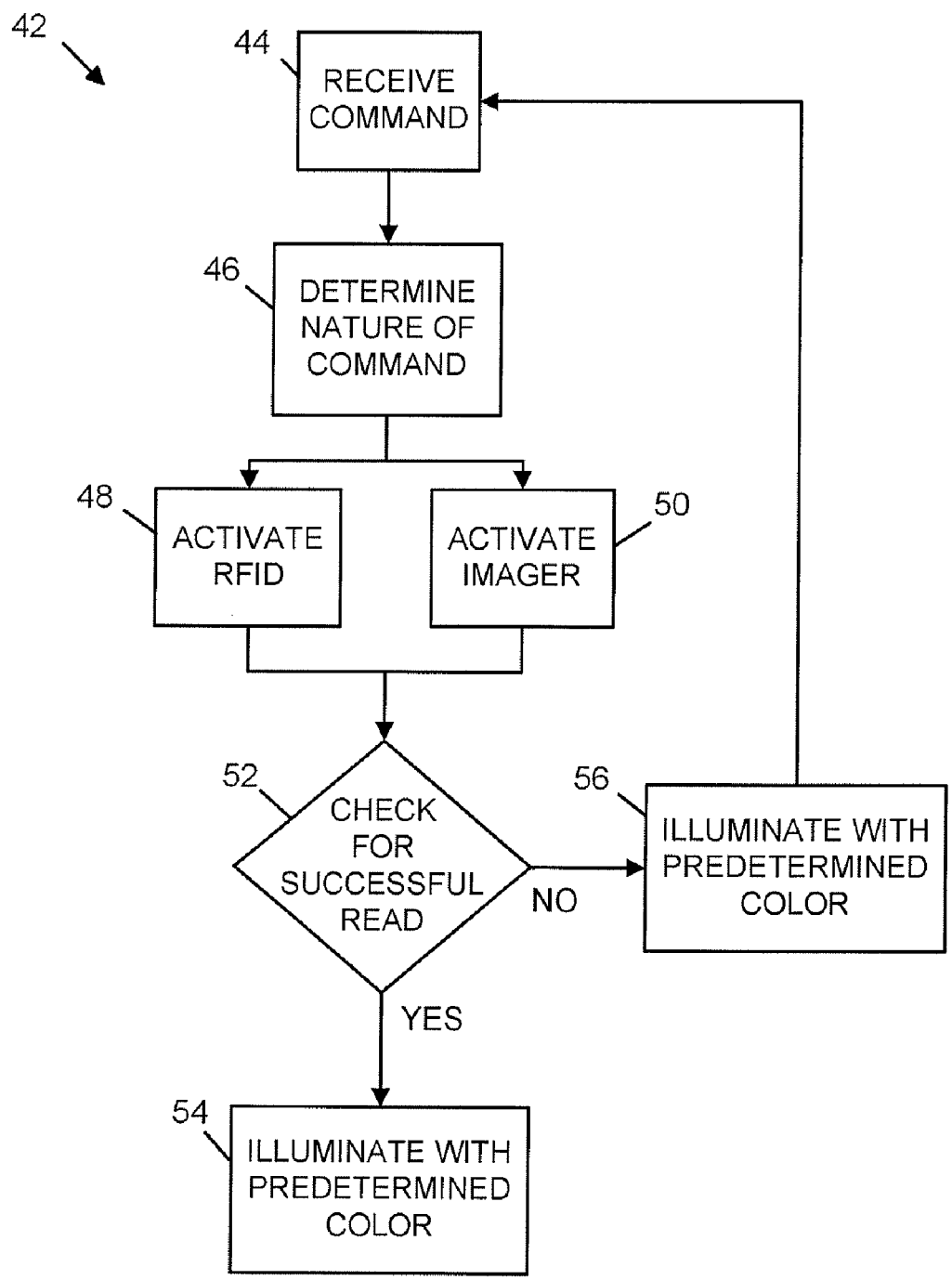
FIG. 4 is a flowchart of a process of controlling a multicolored illumination source according to the present invention.

Referring to FIG. 4, reader 10 implements a feedback process 42 to indicate to a user whether the target, whether a barcode or RFID tag, has been successfully decoded or interrogated, once reader 10 has been directed at the target and the user triggers imaging or interrogation of the target. Process 42 begins with reader 10 receiving a trigger command 44 to read or interrogate a target. The command is interpreted 46 to determine whether it involves barcode decoding, RFID interrogation, or both. If barcode reading has been commanded, imager 14 is activated 48 to capture an image of the target. If RFID has instead or additionally been commanded, RFID unit 16 is activated 50 to interrogate any RFID tag in proximity to reader 10. In either case, a check is performed 52 to determine whether the barcode read or tag interrogation was successful. If so, illumination source 26 is activated 54 to illuminate the target with a predetermined color of lights, such as green. If not, illumination source 26 is activated 56 to illuminate the target with a different predetermined color of light, such as red, and control returns to the beginning. Illumination source 26 may optionally be activated to provide one predetermined color for successful barcode reading, such as green, and a different predetermined color for a successful RFID interrogation, such as blue. Thus, no additional user indicators are needed to reflect status to the user, and the user does not need to divert attention away from the target to confirm reading or interrogation status. This aspect of the present invention is particularly useful in situations where it is not feasible to present separate status indicators, such as in connection with legacy medical devices, or where the user otherwise would need to move or turn away from the work area to confirm the status of operations, thereby reducing productivity and increasing the risk for error.

What is claimed is:

1. An auto-identification user feedback system, comprising:
    an optical imager for capturing an image of a target and reading a barcode at the target;
    a radio frequency identification (RFID) reader for interrogating said target and reading an RFID tag at the target;
    an illumination source associated with said optical imager and aligned to emit light of a first color and a second color onto said target before and after the reading; and
    a microcontroller interconnected to said imager, said reader, and said illumination source, wherein said microcontroller is programmed to operate said illumination source to emit light of said first color onto said target when the RFID reader successfully reads said target and is further programmed to operate said illumination source to emit light of said second color onto said target when said RFID reader unsuccessfully reads a target;
    a host interface for interconnecting said microcontroller to a host device; and
    wherein said microcontroller is further programmed to include a serial command interpreter for interpreting serial commands received from said host device through said host interface and triggering the operation of said optical imager and said RFID reader based on said host serial commands and then sending data to said host device through said host interface, wherein the imager, RFID reader, illumination source, and microcontroller are all contained within a device of the system; and wherein said received serial commands cause said device to read at the target via the optical imager and RFID reader without human input at the device for commencing the reading.

2. The system of claim 1, wherein said optical imager successfully reads a target by recognizing barcode information in a captured image.

3. The system of claim 2, wherein said reader successfully reads a target by interrogating a remotely positioned radiofrequency identification tag and receiving data from said tag.

4. The system of claim 3, wherein said first color and said second color are different.

5. The system of claim 1, wherein said illumination source emits light of a third color.

6. The system of claim 5, wherein said microcontroller is programmed to operate said illumination source to emit light of said first color when said imager successfully reads a target, to operate said illumination source to emit light of said third color when said reader successfully reads a target, and to operate said illumination source to emit light of said second color when said imager or said reader unsuccessfully read a target.

7. The system of claim 6, wherein said first light is green, said second light is blue, and said third light is red.

8. A method of providing user feedback in an auto-identification system, comprising the steps of:
    sending serial trigger commands from a host to a remotely positioned device having an RFID reader for reading an RFID tag at the target, an imaging barcode reader for reading a barcode at the target, an illumination source, and a microcontroller associated with said RFID reader and barcode reader, wherein the RFID reader, barcode reader, illumination source, and microcontroller are all contained inside the device;
    directing said illumination source at a target;
    activating at least said RFID reader based on the receipt of the serial trigger commands sent by the host;
    determining whether said RFID reader successfully reads said target; illuminating said target with light of a first color if said RFID reader successfully reads said target;
    illumination said target with light of a second color if said first reader does not successfully read said target;
    and wherein said serial trigger commands cause said device to read at the target via the optical imager and RFID reader without human input at the device for commencing the reading.

9. The method of claim 8, wherein said first color is green and said second color is red.

10. The method of claim 8, further comprising the step of activating said second autoidentification reader.

11. The method of claim 9, further comprising the step of illuminating said target with light of a third color if said second reader successfully read said target.

12. The method of claim 10, wherein said first color is green, said second color is red, and said third color is blue.

* * * * *